(12) United States Patent
Kianian (10) Patent No.: US 7,533,063 B2
(45) Date of Patent: May 12, 2009

(54) SMART MEMORY CARD WALLET

(75) Inventor: Sohrab Kianian, Los Altos, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 116 days.

(21) Appl. No.: 09/881,788

(22) Filed: Jun. 14, 2001

(65) Prior Publication Data

US 2002/0194139 A1 Dec. 19, 2002

(51) Int. Cl.
*G06F 17/60* (2006.01)
(52) U.S. Cl. ............... 705/64; 705/65; 705/67; 705/75
(58) Field of Classification Search ............ 705/64, 705/65, 75, 67
See application file for complete search history.

(56) References Cited

U.S. PATENT DOCUMENTS

| | | | | |
|---|---|---|---|---|
| 6,032,857 | A * | 3/2000 | Kitagawa et al. ............ 235/379 |
| 6,101,477 | A | 8/2000 | Hohle et al. | |
| 6,131,090 | A | 10/2000 | Basso, Jr. et al. | |
| 6,199,114 | B1 * | 3/2001 | White et al. ................ 709/229 |
| 6,406,371 | B1 * | 6/2002 | Baba et al. .................... 463/42 |
| 6,496,950 | B1 * | 12/2002 | Zhao et al. .................. 714/718 |
| 6,694,449 | B2 * | 2/2004 | Ghameshlu et al. ........... 714/11 |
| 7,111,051 | B2 * | 9/2006 | Nobakht et al. ............ 709/217 |
| 2001/0004354 | A1 * | 6/2001 | Jolitz ......................... 370/328 |
| 2001/0047497 | A1 * | 11/2001 | Larson et al. ................ 714/42 |
| 2002/0081559 | A1 * | 6/2002 | Brown et al. ............ 434/307 R |
| 2003/0158790 | A1 * | 8/2003 | Kargman ...................... 705/26 |
| 2003/0217004 | A1 * | 11/2003 | Drummond et al. .......... 705/43 |
| 2004/0045002 | A1 * | 3/2004 | Berger et al. ................ 718/102 |
| 2004/0205155 | A1 * | 10/2004 | Nobakht et al. ............ 709/217 |
| 2005/0198136 | A1 * | 9/2005 | Kawamoto et al. .......... 709/204 |

FOREIGN PATENT DOCUMENTS

JP 20033196573 A * 7/2003

* cited by examiner

*Primary Examiner*—Pierre E Elisca
(74) *Attorney, Agent, or Firm*—DLA Piper LLP (US)

(57) ABSTRACT

A system includes at least one server and at least one host computer coupled to a communication network. A memory card wallet includes a content addressable memory that stores server identifiers, such as URLs, and user information associated with the resource provider, such as user identification numbers and passwords. The user inserts the memory card wallet into the host computer, and instead of entering user identifiers and passwords, the memory card wallet can provide such information to the server. When the user enters a server identifier that matches a server identifier stored in the content addressable memory, the memory card wallet provides the user information associated with the matched sever identifier.

28 Claims, 6 Drawing Sheets

FIG. 1

| VISA ISSUING BANK | CREDIT CARD # | NAME | EXPIRATION | URL 1 | ALERT FIELD |
|---|---|---|---|---|---|
| AMAZON.COM | PASSWORD | SHIPPING ADDRESS | CREDIT CARD | URL 2 | ALERT FLAG |
| ON-LINE BROKER | PASSWORD | ACCOUNT # | | URL 3 | |
| EMAIL | PASSWORD | USER NAME | | URLn | |

SMART MEMORY CARD WALLET

BACKGROUND OF THE INVENTION

The present invention relates to a portable electronic memory device, and more particularly to a memory card wallet for storing user identification and user passwords corresponding to websites or card readers, such as automated teller machines (ATM).

Commerce on the Internet has grown along with non-commerce on the Internet. However, security concerns in on-line transactions, data exchange and other on-line business-to-consumer interactions are major hurdles for more rapid, widespread adoption of goods, services and information provided over the Internet. Consumers that move between various computer interfaces to the internet have to carry or memorize a multitude of favorite websites, user identifications, passwords, credit or debit cards, and other unique individual data in order to interact in this medium.

It is desirable to have a way to access sites on the Internet without memorization of a large number of websites, identification numbers, user names, and passwords, and be able to use the same data independent of the Internet access platform.

SUMMARY OF THE INVENTION

In one aspect of the present invention, a memory card wallet comprises an interface, a content addressable memory, and a controller. The interface receives a server identifier from a host computer. The content addressable memory stores at least one pre-determined server identifier and user information associated with the at least one pre-determined server identifier. The controller determines whether there is a match between the received server identifier and the at least one pre-determined server identifier and provides the user information associated with the matching pre-determined server identifier.

In another aspect of the present invention, the memory card wallet stores a user password and the controller enables the providing of user information associated with the matching pre-determined server identifier in the event that a received password matches the stored user password. In other aspects of the present invention, the server identifier is a website address, and the user information includes a user identifier and an authorization code associated with the website address.

In various aspects of the present invention, the memory may include a data structure comprising at least one entry with each entry having a searchable field and a non-searchable field. The searchable field stores one of the at least one pre-determined server identifier, and the non-searchable field stores the user information associated with a corresponding at least one pre-determined server identifier.

In another aspect of the present invention, the controller erases the at least one pre-determined server identifier and the user information associated with the at least one pre-determined server identifier in response to an erase command from a server associated with said received server identifier. The erase command may be generated in response to a user command provided to the server prior to an access corresponding to said server identifier.

In another aspect of the present invention, a system comprises a memory card wallet, a host computer, a resource provider, and a communication network. The resource provider provides via the communication network a prompt in response to a user request and allows access to a portion of a resource in response to a match between authorization request information and a predetermined authorization code. The host computer provides the user request in response to user input. The memory card wallet stores a resource identifier and authorization request information associated with at least one resource provider and provides the authorization request information in response to a match between the user request and said resource identifier stored in the memory card wallet.

In another aspect of the present invention, a method comprises comparing a received server identifier to at least one pre-selected server identifier stored in a memory card wallet, and providing user information stored in the memory card wallet and associated with the stored at least one pre-selected server identifier in the event that the received server identifier matches a stored pre-selected server identifier.

In other aspects of the present invention, the method may comprise providing an indication in the event that the received server identifier does not match any stored pre-selected server identifier, enabling said providing user information associated with the matching pre-selected server identifier in the event that a received password matches a user password stored in the memory card wallet, providing the user information in the event that the match between the received server identifier and the one of the at least one pre-determined server identifiers is at least a partial pre-defined match, or storing user information in the event that there is not a match between the received server identifier and any of the at least one pre-determined server identifiers.

In other aspects of the present invention, the method may include the server identifier being a website address, the user information including a user identifier and an authorization code associated with the website address, the memory being a content addressable memory.

In another aspect of the present invention, the method may include erasing at least one pre-determined server identifier and the user information associated with the at least one pre-determined server identifier in response to an erase command from a server associated with the received server identifier, wherein the erase command is generated in response to a user command provided to said server prior to an access corresponding to said server identifier.

DETAILED DESCRIPTION

As an overview of one embodiment, a memory card wallet stores user-preferred website addresses, user identification and passwords associated with the user-preferred website addresses. The memory card wallet is inserted into a host computer, which is connected to the Internet. An accessed website sends address information via the Internet through the host computer to the memory card wallet. If the sent website address information matches one of the user-preferred website addresses stored in the memory card wallet, the memory card wallet provides the corresponding user identification and password to the host computer for transmission to the website. The memory card wallet provides a level of security that the stored contents are not readable without entering the stored website address. The memory card wallet may also include software for executing a password authorization as another level of security.

Figure 1:
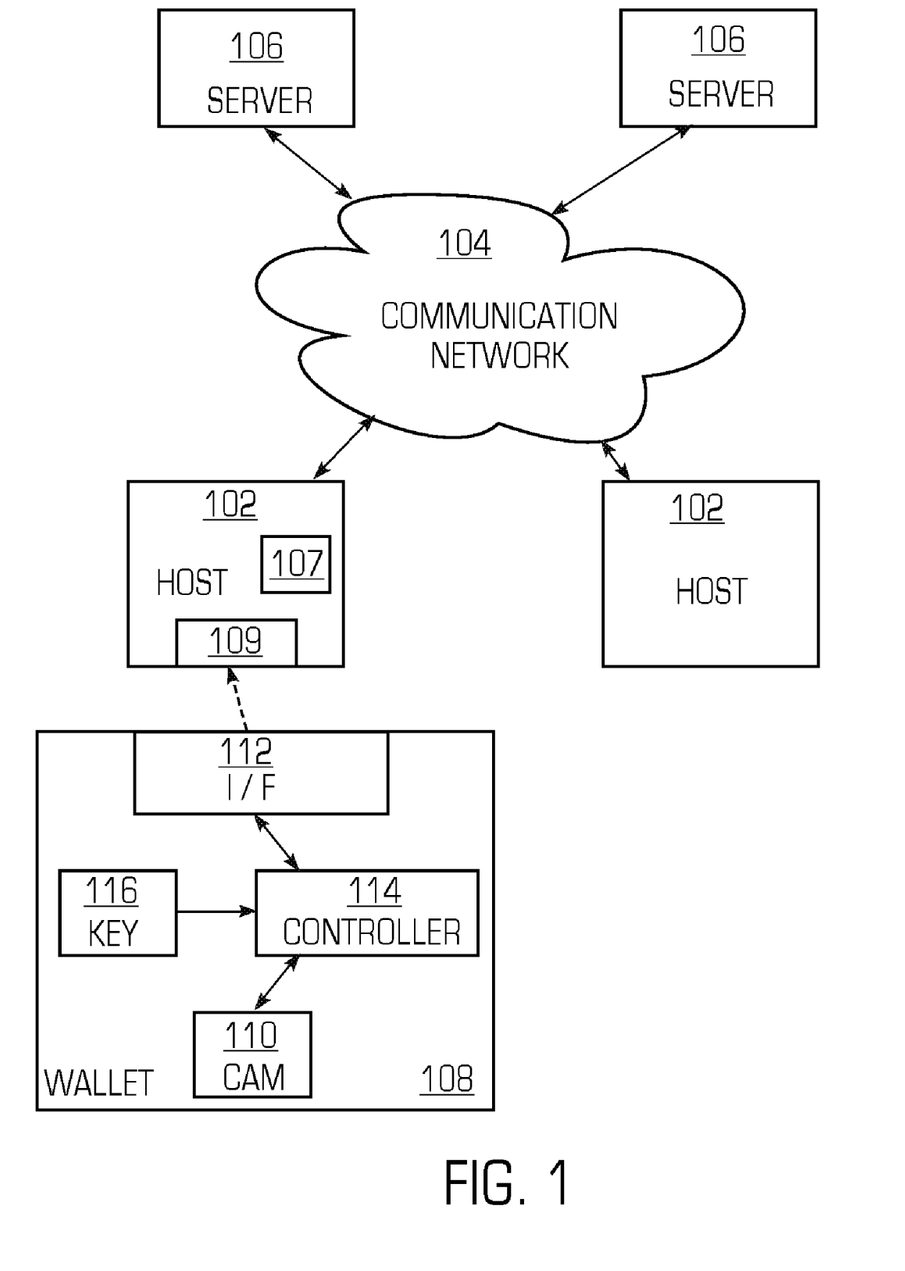
FIG. 1 is a block diagram of a communication system comprising a memory card wallet in accordance with the present invention.

FIG. 1 is a block diagram of a communication system 100 in accordance with the present invention. The communication system 100 comprises a plurality of clients or host computers 102, a communication network 104, a plurality of servers 106, and at least one memory card wallet 108.

The host computer 102 includes a receiving section 109, such as a slot, for physically and electrically coupling to the memory card wallet 108. The host computer 102 may be, for example, a personal computer, a notebook computer, a personal digital assistant (PDA), a wireless telephone with Internet capability, or an Internet appliance.

Communication between the host computers 102 and the servers 106 via the communication network 104 may be via a standard protocol, such as Transmission Control Protocol/Internet Protocol (TCP/IP). In one embodiment, the communication network 104 is the Internet. For the sake of illustration, the communication network 104 is referred to hereinafter as the Internet 104.

The host computer 102 includes communication software 107 for interfacing or communicating with the communication network 104. Software executed by the host computers 102 for communicating with the memory card wallet 108 may be part of or separate from the communication software 107. In one embodiment of the present invention, the communication software 107 is an Internet browser, such as Netscape Communicator by Netscape Communications Corporation of Mountain View, Calif. or Internet Explorer by Microsoft Corporation of Redmond, Wash. For the sake of illustration, the communication software 107 is referred to hereinafter as the Internet browser 107.

In one embodiment, the server 106 is a service or resource provider. The data required for completing a transaction with the resource provider 106 may vary depending on the type of goods or services provided by the resource provider 106. For example, a resource provider 106 that is a financial institution, such as a bank, insurance company, an on-line stockbroker, or 401(k) provider, may require a user account number and password. In another example, a resource provider 106 that is a book retailer may also require a shipping address and credit or debit card information.

The memory card wallet 108 preferably has physical dimensions that allow a user to carry the memory card wallet 108, for example, in a wallet, pocket, or purse. In one embodiment, the memory card wallet 108 has outside dimensions approximately equal to those of a conventional credit or debit card. The memory card wallet 108 preferably has a standard physical form factor, such as Personal Computer Memory Card International Association (PCMCIA) standard.

The memory card wallet 108 includes a non-volatile memory 110, an interface 112. a controller 114, and a key 116. in one embodiment of the present invention, the non-volatile memory 110 is a content addressable memory (CAM). For the sake of illustration, the non-volatile memory 110 is referred to herein as content addressable memory 110. An embodiment of the content addressable memory Is described in co-pending patent application entitled Differential non-volatile content addressable memory cell and array, application Ser. No. 09/527,373, filed Mar. 16, 2000, now U.S. Pat. No. 6,639,818, by lsao Nojima and assigned to the same assignee as this patent application, the subject matter of which Is incorporated herein by reference. In one embodiment, the content addressable memory 110 reads out the contents of an entry therein In response to a match between received data and the contents of a searchable portion of the entry. In another embodiment, the content addressable memory 110 reads out the contents of an entry therein in response to a partial match between the received data and the contents of the searchable portion of the entry.

The interface 112 is a physical and electrical connection between the host computer 102 and the controller 114, the non-volatile memory 110 and the key 116. In one embodiment, the interface 112 includes a buffer for serial output of data. The controller 114 may be, for example, a microprocessor. The key 116 stores a password, an identifier or the like. The controller 114 compares a user provided password to the stored key 116, and, in the event of a match, allows access to the content addressable memory 110. In one embodiment, the memory card wallet 108 does not include a key 116.

Figure 2:
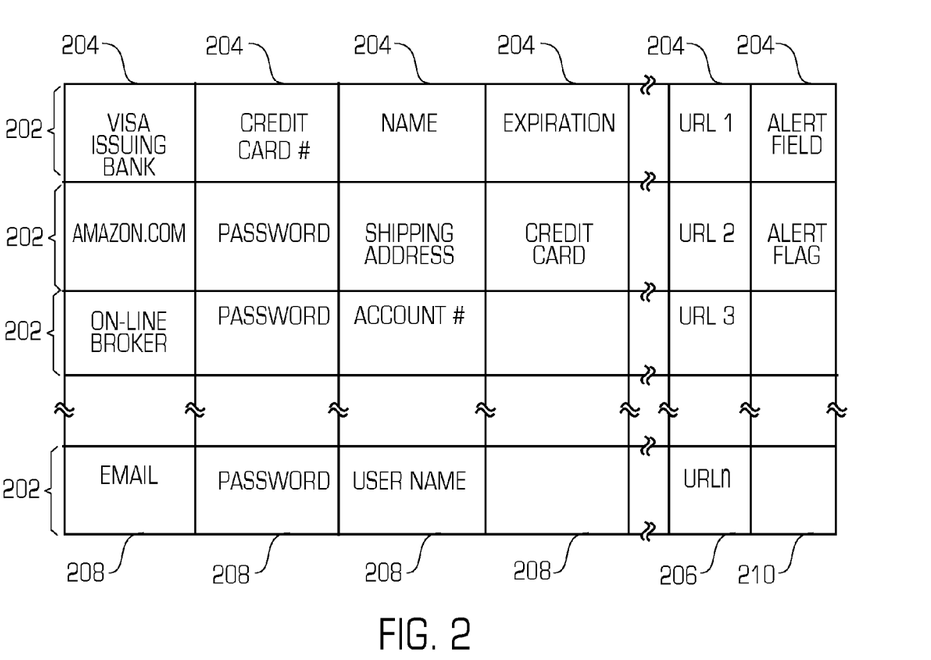
FIG. 2 is a block diagram illustrating the data structure of the content addressable memory of the memory card wallet of FIG. 1.

FIG. 2 is a block diagram illustrating the data structure of the content addressable memory 110 of the memory card wallet 108. The data structure comprises a plurality of entries 202. In one embodiment, each entry 202 corresponds to a single secure resource provider 106. In another embodiment, each entry 202 corresponds to a single website address. For the sake of illustration, an entry 202 is shown as a row, but the invention is not so limited. Each entry 202 includes a plurality of fields 204. The fields 204 may be, for example, user identifiers, user characteristic information, user financial information, user preferences and resource provider information. Illustrative examples of user identifiers include identification numbers, account numbers, and passwords. Illustrative examples of user financial information include credit or debit card numbers and expiration dates. Illustrative examples of user preferences and resource provider information include cookies, uniform resource locator (URLs), and unique identifiers. Cookies and URLs are well known in the art.

The fields 204 include searchable fields 206, nonsearchable fields 208, and alert fields 210. The searchable fields 206 are fields 204 that the content addressable memory 110 uses to compare to the entered addresses. For clarity, only one searchable field 206 is shown, but the entry 204 may have multiple searchable fields 206. The nonsearchable fields 208 are fields 204 that the content addressable memory 110 does not use to compare the entered addresses, but contain information that is provided in the event that there is a match of the entered address and the content of a corresponding searchable field 206. The alert fields 210 are fields 204 that the user sets to indicate the contents of the entry 202 corresponding to the alert field 210 are to be erased in the event that the server 106 has been commanded to erase the entry 202 if the alert field 210 is set. The content addressable memory 110 provides the entire entry 202 in response to a match between the URL and one of searchable fields 206 of the entry 202. In one embodiment, the match with the URL can be a partial match.

Figure 3A:
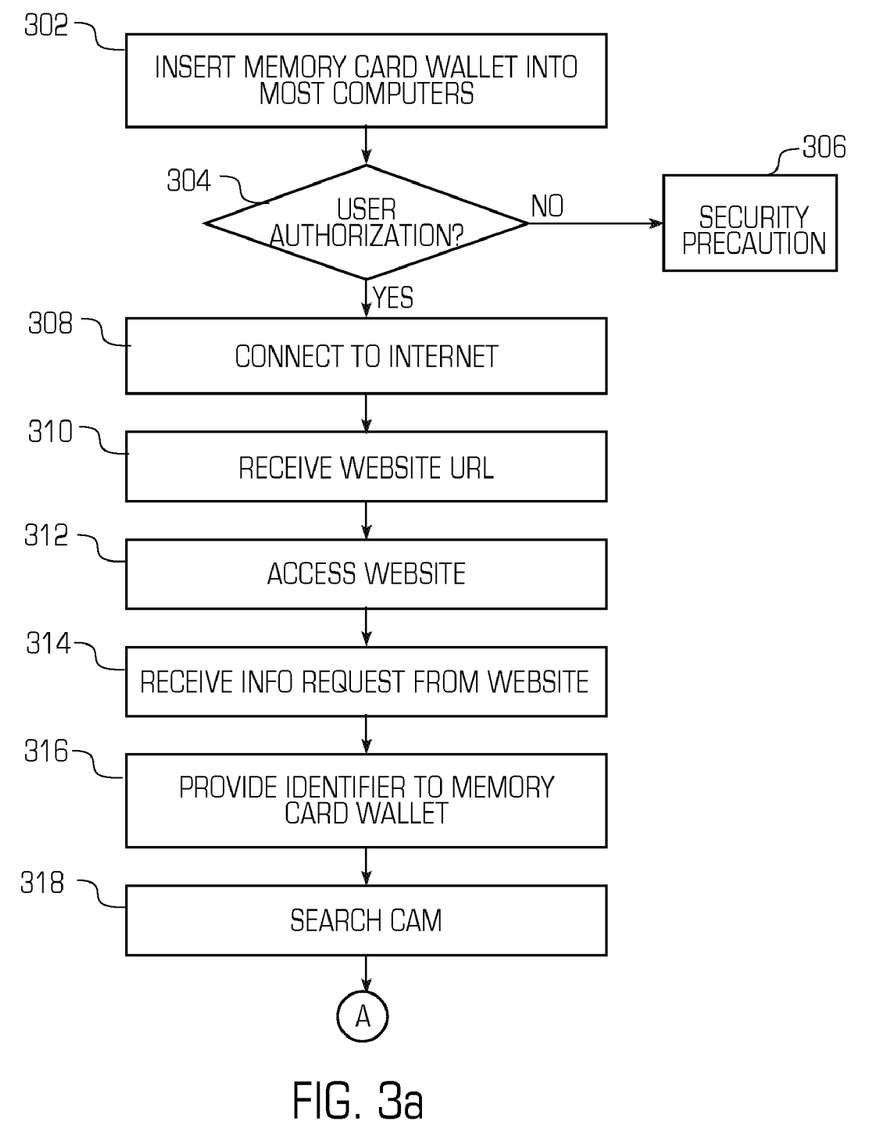
FIGS. 3a and 3b are flow charts illustrating the operation of the communication system of FIG. 1.
Figure 3B:
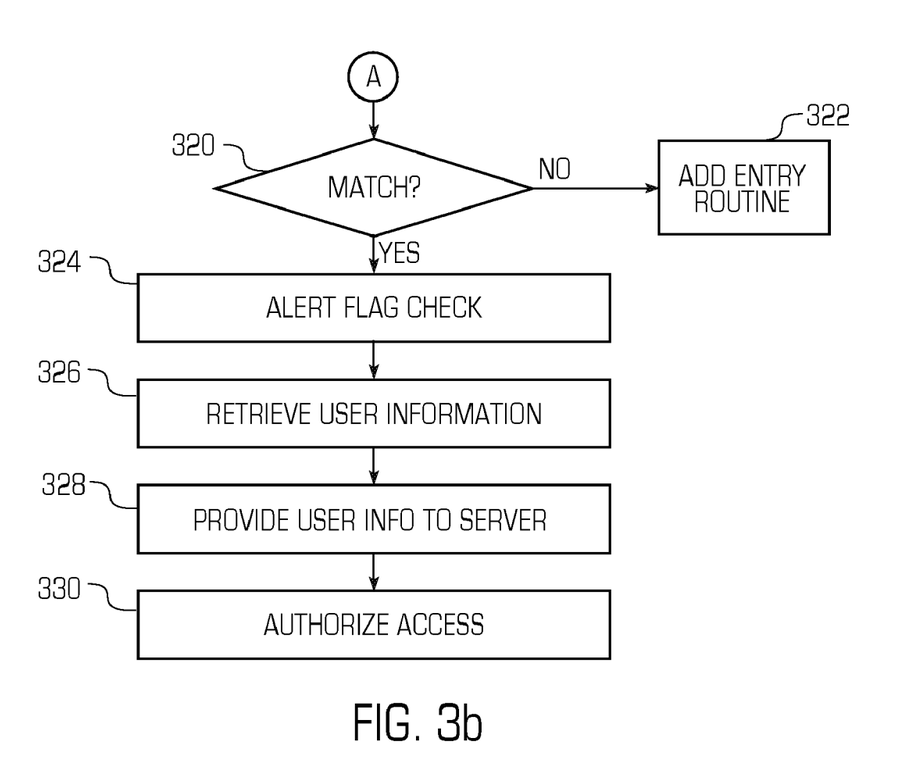

FIGS. 3a and 3b are flow charts illustrating the operation of the communication system 100. A user inserts the memory card wallet 108 into one of the plurality of host computers 102 (block 302). The memory card wallet 108 performs a user authorization by prompting the user to enter a password or key to allow access to the contents of the memory card wallet 108 in the event that the entered password or key matches the stored key 116 (block 304). In another embodiment, the memory card wallet 108 does not include a key 116 or perform a user authorization using a key 116.

If there is not a match (block 304), the memory card wallet 108 executes a security precaution routine (block 306). In one embodiment, the memory card wallet 108 provides a failure indication to the host computer 102 and does not provide user information in response to an identifier. The host computer 102 may or may not display failure information to the user depending on a desired level of security. In another embodiment, the memory card wallet 108 provides a false user identification and password in order to trigger a lock out or time out by the accessed website 106 in response to a pre-defined number of failed access requests.

On the other hand, if there is a match of the entered password and the stored key 116 (block 304), using the Internet browser 107, the host computer 102 connects to the Internet 104 (block 308). In one embodiment, the connection to the Internet 104 does not require the memory card wallet 108. In another embodiment, the memory card wallet 108 provides the authentication information (e.g., user identification and password) for allowing the host computer 102 to connect to the Internet 104. In a well-known manner, the user enters a URL into the Internet browser 107 (block 310), and the Internet browser 107 access a website 106 corresponding to the entered URL (block 312). The website 106 sends an identifier to the host computer 102 (block 314). The website identifier may be, for example, a website address, a website identification code, or a cookie.

The host computer 102 provides the website identifier to the memory card wallet 108 (block 316). The memory card wallet 108 searches the content addressable memory 110 for a match between the contents (e.g., a searchable field 206) of the content addressable memory 110 and the received website identifier (block 318).

Figure 4:
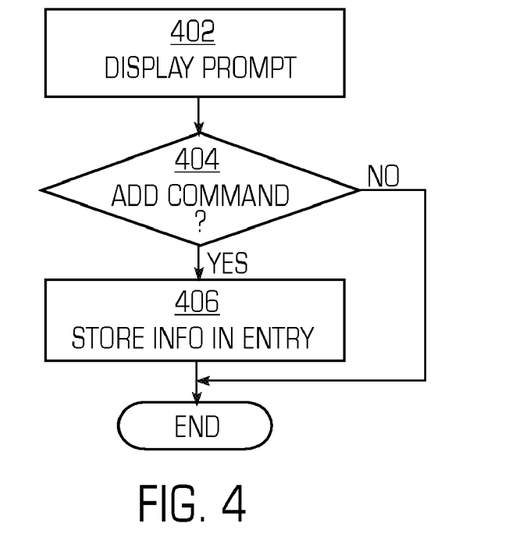
FIG. 4 is a flow chart illustrating the operation of adding an entry to the content addressable memory of the memory card wallet of FIG. 1.

If there is not a match (block 320), the host computer 102 executes a routine for allowing the user to add the website and the user identifiers and passwords corresponding to the website to the content addressable memory 110 as described in conjunction with FIG. 4 (block 322).

FIG. 4 is a flow chart illustrating the operation of adding an entry 202 to the content addressable memory 110 of the memory card wallet 108. If there is not a match (block 318 of FIG. 3), the website sends display information, such as a hypertext markup language (HTML) web page, to the internet browser 107 to display prompts or requests for user information. The displayed web page may also prompt the user to indicate whether the user wants the user information and the corresponding identifier stored in the memory card wallet 108 (block 402). In response to a user request (block 404), the host computer 102 commands the memory card wallet 108 to create an entry 202 that stores the user information into non-searchable fields 208, stores the website identifier in a searchable field 206 of the new created entry 202, and stores an alert flag 210 if requested (block 406).

The addition of new entries 202 to the memory card wallet 108 by a user other than the authorized user does not compromise the contents of the memory card wallet 108. In order to access the contents entered by the authorized user, the unauthorized user provides an address that matches the contents of the content addressable memory 110. Absent knowledge or correct guessing of a stored address, the unauthorized user does not access the entries 202 stored by the authorized user. In one embodiment, the content addressable memory 110 does not protect an entry 202 from being overwritten and thus allows overwriting of entries 202 in the event that the content addressable memory 110 becomes full.

Refer again to FIG. 3. On the other hand, if there is a match (block 320), the memory card wallet 108 retrieves the entry 202 in the content addressable memory 110 that corresponds to the received website identifier, and determines whether an alert flag 210 corresponding to the entry 202 has been set by executing a routine described in conjunction with FIG. 5 (block 324). As described below in conjunction with FIG. 7, an authorized user of the memory card wallet 108 who loses the wallet 108 can set a website alert flag at a website 106 so that subsequent use of the lost memory card wallet 108 at the website 106 causes the entry 202 corresponding to the website 106 or other websites 106 to be erased.

Figure 5:
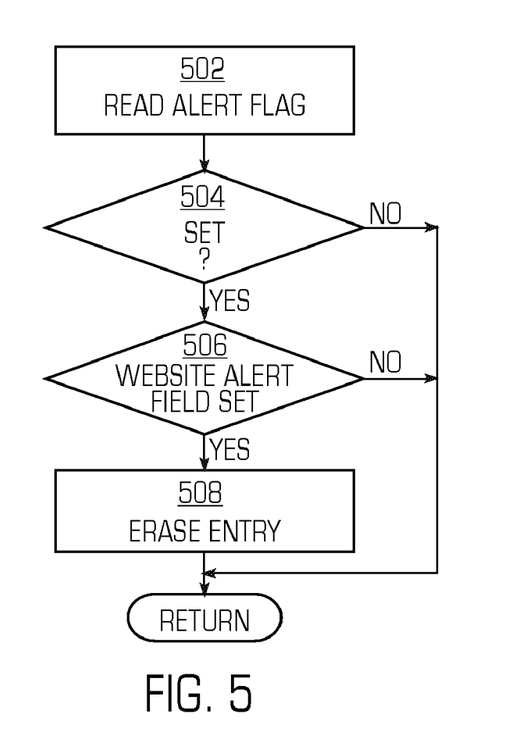
FIG. 5 is a flow chart illustrating the operation of using a website to delete an entry from the content addressable memory of the memory card wallet of FIG. 1.

FIG. 5 is a flow chart illustrating the operation of deleting an entry 202 from the content addressable memory 110 of the memory card wallet 108 by a website 106. After a match of the website address is determined (block 318), the controller 114 reads the alert flag 210 corresponding to the entry 202 matching the website address (block 502). If the alert flag 210 is set (block 504), the controller 114 determines whether the website alert flag for the website 106 is set (block 506). If the website alert flag is set, the controller 114 erases the entry 202 corresponding to the requested website (block 508). Afterwards, or if the alert flag 210 is not set (block 504) or the website alert flag is not set (block 506), the operation as described in FIG. 3 continues (block 510).

In another embodiment of the present invention, the website 106 receives the user request to delete the entry 202 and provides an authorization signal to the host computer 102, which then commands the memory card wallet 108 to erase the corresponding entry 202. Such an embodiment allows an owner of a memory card wallet 108 that loses the memory card wallet 108 to access the website 106 without the memory card wallet 108 and instruct the website to cancel authorization to the website 106 by the memory card wallet 108. In another embodiment, the owner of the memory card wallet 108 may instruct the website 106 to erase the entire contents of the memory card wallet 108.

Refer again to FIG. 3. The memory card wallet 108 provides the retrieved entry 202 to the host computer 102 (block 326). In response to prompts, requests or commands from the website 106, the host computer 102 provides the retrieved entry 202 to the website 106 (block 328). If the retrieved contents comply with the requested transaction information from the website 106, the website 106 authorizes the user to interact with the website 106 or complete the requested transaction (block 330).

In an illustrative example, the user inserts his memory card wallet 108 into a computer 102 at an airport in order to check his stock listings via the Internet 104 (block 302). Recognizing the memory card wallet 108 has been inserted, the computer 102 at the airport prompts the user to authorize his use of the memory card wallet 108 by providing a password (block 304). If authorized, using the Internet browser 107, the computer 102 connects to the Internet 104 (block 308). The user now can access the Internet 104 and is authorized to read the contents of the memory card wallet 108.

The user enters the URL for the website 106 of the on-line stockbroker and navigates via the Internet browser 107 to a log-in page (block 310 and 312). In the log-in page, the website 106 prompts the user to enter his account number and his password for the account (block 314). At this time, the user does not need to remember or enter his account number or password. Instead, the memory card wallet 108 provides this information. Specifically, the computer 102 provides the URL for the log-in page to the memory card wallet 108 (block 316). The memory card wallet 108 searches the content addressable memory 110 for a match between the contents of the content addressable memory 110 and the URL of the on-line stockbroker (block 318). Because the user knows the URL of his on-line stockbroker and enters the URL correctly, there is a match between the URL and an entry 202 in the content addressable memory 110 that corresponds to the URL (block 320). The memory card wallet 108 retrieves the entry 202, which contains the account number and the password, and provides the retrieved account number and the password to the computer 102 (block 326), which in turn provides the information to the on-line stockbroker server 106 (block 328). The on-line stockbroker server 106 authorizes the user to use the website 106 to view his stock listings and do other transactions such as trading securities or research as allowed by the on-line stockbroker server 106 (block 330).

But if the user of the memory card wallet 108 is not an authorized user, the user has to guess the password in order to use the memory card wallet 108 in those embodiments requiring a password (block 304). Even assuming the password is guessed or not required, the user again has to guess correctly a website that the user has stored in the memory card wallet 108. For incorrect guesses, that is, there is not a match (block 320), the memory card wallet 108 allows the user to add an entry 202 (block 320), but the memory card wallet 108 does not provide user information in response to the incorrect URL. As noted above, in another embodiment, the memory card wallet 108 provides a false user identification and password in order to trigger a lock out or time out by the accessed website 106 in response to a pre-defined number of failed access requests.

Figure 6:
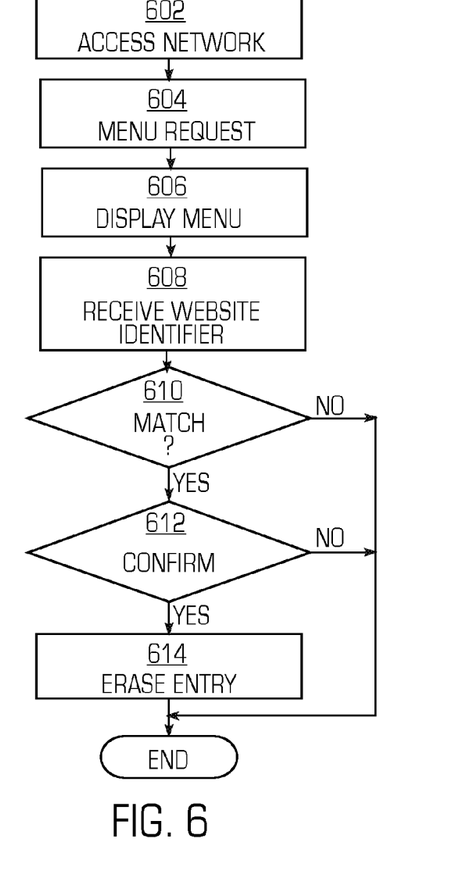
FIG. 6 is a flow chart illustrating the operation of deleting an entry from the content addressable memory of the memory card wallet of FIG. 1.

FIG. 6 is a flow chart illustrating the operation of deleting an entry 202 from the content addressable memory 110 of the memory card wallet 108. The user accesses an Internet service provider or otherwise establishes a connection to the Internet 104 (block 602). The user then via the Internet browser 107 requests a menu that provides prompts to the user to request data regarding the entry 202 to be deleted (block 604). After the menu is displayed (block 606), the user enters the website identifier into the host computer 102 (block 608). If the website identifier matches one of the entries 202 (block 610), the host computer 102 sends a confirmation request, and if a confirmation is made (block 612), the host computer 102 commands the memory card wallet 108 to erase the entry 202 corresponding to the website identifier (block 614). The display menu may include an exit option as is well known in the art.

Figure 7:
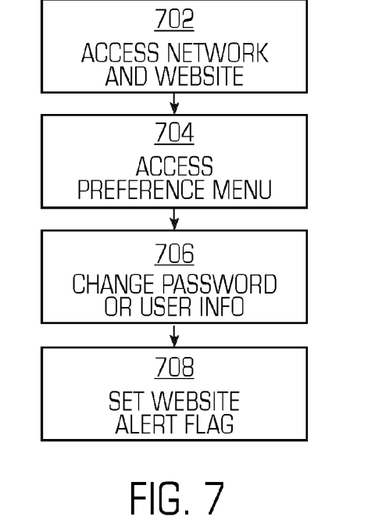
FIG. 7 is flow chart illustrating the operation of setting user preferences at a website including setting a website alert flag for later erasing of an entry in the content addressable memory of the memory card wallet of FIG. 1.

FIG. 7 is flow chart illustrating the operation of setting user preferences at a website including setting a website alert flag for later erasing of an entry 202. The user accesses an Internet service provider and a website 106 (block 702). By navigating in a well-known manner, the user accesses a preference menu on the website (block 704). The user can set or change user information in the entry 202 corresponding to the website 106 by changing the preferences at the website 106 (block 706). The user may also set a website alert flag (block 708).

The memory card wallet 108 provides a level of security of user information that is greater than that of slips of paper in a wallet. For an unauthorized user to access a memory card wallet 108, the unauthorized user must guess or know the URL of a stored entry in the content addressable memory 108. As an added level of security, the memory card wallet 108 may include a key 116 that uses a password to gain access. A lost memory card wallet 108 can be erased at the first usage by setting a website alert flag after the authorized user realizes the memory card wallet 108 is lost.

In other embodiment, an entry 202 may include an expiration date field that requires the entry 202 be accessed before the expiration date in order to retrieve the contents of the entry 202. Such embodiment sets the entry 202 to be time sensitive so that a lost memory card wallet 108 has a maximum time risk.

A user may have multiple accounts at a particular website. For example, a user may have multiple accounts (e.g., joint, single, and trust) for an on-line stock broker. In one embodiment, a master account is established for an entity and is linked to subaccounts.

Figure 8:
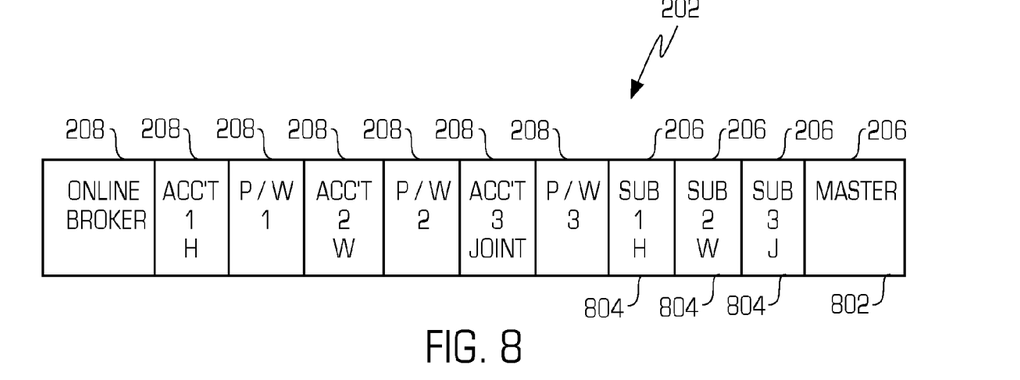
FIG. 8 is a block diagram illustrating the data structure for master account and subaccount linked entries of the content addressable memory of the memory card wallet in FIG. 2.

FIG. 8 is a block diagram illustrating the data structure for master account and subaccount linked entries of the content addressable memory 110 of the memory card wallet 108. For clarity, only one entry 204 is shown, but the content addressable memory 110 may store more than one entry 204. The data structure of FIG. 8 includes more than one searchable field 206. An entry 204 corresponds to a master account 802 and subaccounts 804 linked to the master account 802. The master account 802 and subaccounts 804 are stored in searchable fields 206. Non-searchable fields 208 include information related to the master account 802 and the subaccounts 804. In response to the URL, the website 106 provides a webpage to the host computer 104 and the memory card wallet 108 provides the user information in the entry 204 corresponding to the master account 802. In response to this authorization, the website 106 provides a webpage displaying a request for information about the desired subaccount 804. The user then enters information related to the subaccount 804 and in response to a match with a searchable field 206 of the entry 204 corresponding to the master account 802, the content addressable memory 110 provides the information in the entry corresponding to the subaccount 804. The information related to the subaccount 804 may be a user selected identifier or a service provider selected identifier. As an illustrative example, a user may have three subaccounts 804 (e.g., husband separate account, wife separate account, and joint account) that form a master account with an on-line brokerage account. The user enters the URL for the on-line broker and the memory card wallet 108 provides the user information for the master account 802. In response, the website 106 for the broker provides a webpage showing the subaccounts or may request the user enter an identifier of the desired subaccount 804. The identifier may be, for example, the word "joint" which matches an entry 204 corresponding to the master account and the joint subaccount 804. The memory card wallet 108 then provides the user information for the joint subaccount 804.

In an alternate embodiment, the subaccounts may be stored as separate entries 204. When the user accesses the website 106 and is prompted to enter user information, the user enters a user defined key to select the corresponding entry 204. In the illustrative example of three subaccounts described above, each subaccount corresponds to a separate entry 204. The user enters an identifier for the desired account. The content addressable memory 110 searches the searchable fields 206 for the entries 204 and provides the user information in the event of a match.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A memory card wallet that stores one or both of user information and user passwords corresponding to user-selected websites, the memory card wallet comprising:
   an interface for receiving a server identifier from a host computer in response to a user input of the server identifier to the host computer;
   a content addressable memory having a data structure comprising at least one entry, each entry having at least one searchable field and at least one nonsearchable field, the searchable field storing at least one pre-determined server identifier corresponding to a respective user-selected website, the nonsearchable field storing user information associated with a corresponding at least one pre-determined server identifier, said at least one pre-determined server identifier and said user information being received via the interface from the host computer in response to user input of the at least one pre-determined server identifier to the host computer; and
   a controller coupled to the interface and the content addressable memory, the controller including processing components configured to read, program and erase the content addressable memory, the controller being configured for:
   accessing the content addressable memory to determine whether there is a match or partial match between the received server identifier and one of the at least one pre-determined server identifier by comparing the received server identifier with the at least one searchable field,
   storing said at least one pre-determined server identifier and said user information in the content addressable memory if there is not a match or partial match between the received server identifier and one of the at least one pre-determined server identifier; and
   providing to the host computer via the interface the user information associated with the matching or partially matching pre-determined server identifier from the nonsearchable field.

2. The memory card wallet of claim 1 wherein the memory card wallet further stores a user password, and the controller enables said providing user information associated with the matching or partially matching pre-determined server identifier in the event that a received password matches the stored user password.

3. The memory card wallet of claim 1 wherein the server identifier is a website address.

4. The memory card wallet of claim 1 wherein the server identifier is a website address and the user information includes a user identifier and an authorization code associated with the website address.

5. The memory card wallet of claim 1 wherein the controller stores user information associated with the received server identifier and received from the user via the interface and the received server identifier in the content addressable memory in the event that there is not a match or partial match between the received server identifier and any of the at least one pre-determined server identifiers.

6. The memory card wallet of claim 1 wherein the controller erases said at least one pre-determined server identifier and said user information associated with said at least one pre-determined server identifier in response to an erase command from server associated with said received server identifier.

7. The memory card wallet of claim 1 wherein the controller erases said at least one pre-determined server identifier and said user information associated with said at least one pre-determined server identifier in response to an erase command from a server associated with said received server identifier, the erase command being generated in response to a user command provided to said server prior to an access corresponding to said server identifier.

8. A method comprising:
   receiving at least one pre-determined user-selected server identifier and user information via an interface of the memory card wallet from a host computer in response to user input of said user-selected server identifier and said user information to the host computer;
   accessing a memory card wallet that stores one or both of said user information and user passwords corresponding to websites in a content addressable memory;
   comparing, by use of a controller located within the memory card wallet, a received server identifier received by the memory card wallet from a user input via the interface to at least one pre-selected server identifiers stored in the content addressable memory of the memory card wallet, the controller including processing components configured to read, program and erase the content addressable memory;
   storing said at least one pre-determined server identifier and said user information in the content addressable memory if there is not a match or partial match between the received server identifier and one of the at least one pre-determined server identifier; and
   providing to the host computer via the interface user information stored in the memory card wallet and associated with the stored pre-selected server identifier in the event that the memory card determines that the received server identifier matches or partially matches one of the at least one pre-selected server identifiers stored in the memory card wallet.

9. The method of claim 8 further comprising providing an indication in the event that the received server identifier does not match or partially match any stored pre-selected server identifier.

10. The method of claim 8 further comprising disabling access to said user information stored in the memory card wallet in the event that the received server identifier does not match or partially match any stored pre-selected server identifier.

11. The method of claim 8 wherein the providing user information further comprises enabling said providing user information associated with the matching pre-selected server identifier in the event that a received password matches a user password stored in the memory card wallet.

12. The method of claim 8 wherein the server identifier is a website address.

13. The method of claim 8 wherein the server identifier is a website address and the user information includes a user identifier and an authorization code associated with the website address.

14. The method of claim 8 wherein the content addressable memory includes a data structure comprising at least one entry, each entry having a searchable field and a nonsearchable field, the searchable field storing one of the at least one pre-determined server identifier, the non-searchable field storing the user information associated with a corresponding at least one pre-determined server identifier.

15. The method of claim 8 further comprising storing user information associated with the received server identifier and received from the user and the received server identifier in the memory card wallet in the event that there is not a match or partial match between the received server identifier and any of the at least one pre-determined server identifiers.

16. The method of claim 8 further comprising erasing said at least one pre-determined server identifier and said user information associated with said at least one pre-determined server identifier in response to an erase command from a server associated with said received server identifier.

17. The method of claim 8 further comprising erasing at least one pre-determined server identifier and said user information associated with said at least one pre-determined server identifier in response to an erase command from a server associated with said received server identifier, the erase command being generated in response to a user command provided to said server prior to an access of said server that corresponds to said server identifier.

18. The method of claim 8 further comprising determining whether there is a match between a received password and a user password stored in the memory card wallet and disabling access to the stored information in the memory card wallet in the event there is not a match, and allowing access to the stored information in the memory card wallet in the event there is a match.

19. A method comprising:
receiving by a host a memory card wallet that stores one or both of user information and user passwords corresponding to user-selected websites or card readers in a content addressable memory located in said memory card wallet, said passwords and said user information being received via an interface of the memory card wallet from the host in response to user input of said passwords and said user information to the host;
receiving at the host a user-selected website address in response to a user input of the user-selected website address provided to the host;
accessing from the host a website associated with said user-selected website address;
receiving a website identifier from the accessed website at the host;
providing said host said received website identifier to the memory card wallet;
accessing the content addressable memory, by use of a controller within the memory card wallet, wherein the controller includes processing components configured to read, program and erase the content addressable memory;
retrieving one or both of user information and user password associated with said user-selected website and said user information stored in the memory card wallet and corresponding to the identifier from the content addressable memory if the memory card wallet determines that there is a match or partial match between the received website identifier and a pre-determined identifier corresponding to said user-selected websites stored in the memory card wallet; and
providing said retrieved one or both of user information and user password associated with said user-selected website and said user information and corresponding to the identifier from the memory card wallet to the host computer for transmission to the website.

20. The method of claim 19 wherein the information in the memory card wallet includes user identification information and a user password associated with the accessed website.

21. The method of claim 19 further comprising:
after receiving said inserted memory card into a host, requesting a password from the user;
determining whether there is a match between the received password and a user password stored in the memory card wallet;
allowing access to said information in the memory card wallet in the event that there is a determined match; and
denying access in the event that there is no match.

22. The method of claim 19 further comprising:
providing a request to store the received identifier in the event that there is not a match or partial match between the received identifier and any of the pre-determined identifier stored in the memory card wallet;
providing a request for user to provide user information associated with such received identifier; and
storing said user information and said received identifier in said memory card wallet.

23. The method of claim 19 further comprising:
deleting said pre-determined identifier matching or partially matching the received identifier and information corresponding to said pre-determined identifier in response to a delete command.

24. The method of claim 23 further comprising:
generating said delete command in response to a user command provided to the accessed website at a time prior to accessing the user selected website address.

25. A system comprising:
a communication network;
a server coupled to the communication network and providing a prompt in response to a user request for access to a portion of a resource and allowing said access to a portion of a resource in response to a match between authorization request information and a predetermined authorization code;
a memory card wallet including a controller and content addressable memory that stores one or both of user information and user passwords corresponding to websites, the memory card wallet storing a server identifier and authorization request information associated with at least one server, instructions for determining whether there is a match or partial match between said user request and said server identifier stored in said memory card wallet in response to the user request, and instructions for providing said authorization request information if the memory card wallet determines said match and in response to said prompt, wherein the controller includes processing components configured to read, program and erase the content addressable memory; and
a host computer coupled to the communication network via a first interface for providing the user request and authorization request information and coupled to the memory card wallet via a second interface for providing said user request in response to a user input, the host computer receiving, via a third interface, a user provided server identifier, the host computer providing said prompt to said user, the host computer providing said at least one pre-determined server identifier and said user information to the controller in response to user input of said at least one pre-determined server identifier and said user information via the third interface to the host computer.

26. The system of claim 25 wherein access to the user information stored in the memory card wallet is disabled in the event that the received server identifier does not match or partially match any stored pre-selected server identifier.

27. A method comprising:
receiving at a client computer a first user-selected identifier as a user input;
providing said first user-selected identifier to a server associated with said first user-selected identifier and corresponding to a website and to a memory card wallet that stores one or both of user information and user passwords corresponding to websites in a content addressable memory located in the memory card wallet, said passwords and said user information stored in said memory card wallet being received via an interface of the memory card wallet from the client computer in response to user input of said passwords and said user information to the client computer;

providing from the server a request for a second user-selected identifier;

accessing, by use of a controller within the memory card wallet, the content addressable memory, wherein the controller includes processing components configured to read, program and erase the content addressable memory;

retrieving from the content addressable memory the second user-selected identifier if the memory card wallet determines that there is a match between the first user-selected identifier and a stored entry in the memory card wallet; and providing said retrieved one or both of user information and user password associated with said user-selected website and said user information and corresponding to the identifier from the memory card wallet to the client computer for transmission to the server.

28. The method of claim 27 wherein the content addressable memory includes a data structure configured for access by the controller such that content stored in the memory may be retrieved without using an explicit address for the content sought.

* * * * *